US009065759B2

(12) United States Patent
Cheng et al.

(10) Patent No.: US 9,065,759 B2
(45) Date of Patent: Jun. 23, 2015

(54) ARCHITECTURE AND PROTECTION METHOD FOR MESH PROTECTION OF N SERVICES WITH M SHARED RESOURCES

(75) Inventors: Weiying Cheng, Naperville, IL (US); Jonathan B. Sadler, Naperville, IL (US); Thomas J. Huber, Naperville, IL (US); Anoop John Mathew, Woodridge, IL (US)

(73) Assignee: Tellabs Operations, Inc., Naperville, IL (US)

( * ) Notice: Subject to any disclaimer, the term of this patent is extended or adjusted under 35 U.S.C. 154(b) by 114 days.

(21) Appl. No.: 13/230,521

(22) Filed: Sep. 12, 2011

(65) Prior Publication Data
US 2013/0064073 A1    Mar. 14, 2013

(51) Int. Cl.
*H04L 12/26* (2006.01)
*H04L 12/707* (2013.01)

(52) U.S. Cl.
CPC .............. *H04L 45/24* (2013.01); *H04L 45/22* (2013.01)

(58) Field of Classification Search
USPC ........................................................ 370/225
See application file for complete search history.

(56) References Cited

U.S. PATENT DOCUMENTS

2012/0163803 A1* 6/2012 Zi ................................... 398/17
2013/0044589 A1* 2/2013 Ceccarelli et al. ............ 370/228

FOREIGN PATENT DOCUMENTS

CN    102013922 A  *  4/2011

OTHER PUBLICATIONS

Multiprotocol Label Switching Transport Profile Survivability Framework—draft-ietf-mpls-tp-survive-fwk-06.txt N. Sprecher, A. Farrel Jun. 20, 2010.*
Machine Translation of CN 102013922 A.*
Braden, Ed., et al; "Resource ReSerVation Protocol (RSVP) Version 1 Functional Specification" [online], Sep. 1997, [retrieved Jan. 21, 2014]. Retrieved from the Internet URL: http://www.ietf.org/rfc/rfc2205.txt.

* cited by examiner

*Primary Examiner* — Huy D Vu
*Assistant Examiner* — Kevin Cunningham
(74) *Attorney, Agent, or Firm* — Hamilton, Brook, Smith & Reynolds, P.C.

(57) ABSTRACT

The embodiments disclosed herein provide a mechanism for sharing protection resources in an arbitrary network topology involving pre-computing the protection resources so that data-plane-based protection can be used to activate the protection resources upon detection of a failure, thus, providing faster switching times than typical control-plane-based solutions. This is accomplished by configuring a mesh network to include, for a working path in the network, one or more protection paths with the same end nodes as the working path, where each protection path includes at least one intermediate node that is not part of the working path. The intermediate node accepts a protection request from one of the end nodes and determines whether a local resource for a protection path is available. If the local resource is available, the intermediate node forwards the protection request along the protection path, but, if the local resource is unavailable, the intermediate node notifies the end node from which the protection request originated that the protection path is unavailable.

26 Claims, 6 Drawing Sheets

ARCHITECTURE AND PROTECTION METHOD FOR MESH PROTECTION OF N SERVICES WITH M SHARED RESOURCES

BACKGROUND OF THE INVENTION

Network operators use protection and restoration mechanisms to increase the availability of service offerings. Implementation of these mechanisms involves a balancing of two competing goals: (1) minimizing the amount of outage time when a failure occurs and (2) minimizing the amount of resources used to provide protection or restoration for the failure. Existing data plane protection provides fast switching times, but requires a large number of network resources dedicated to protection. Control plane restoration is used in some networks to reduce the number of network resources needed by using dynamic signaling of a restoration path at the time a failure is detected, but at the expense of a longer switching time.

SUMMARY OF THE INVENTION

One embodiment of the present invention is a mesh network that includes one or more working paths, each with two end nodes. The network also includes one or more protection paths, each with the same end nodes as a corresponding working path and at least one intermediate node that is not part of the working path. The intermediate node is configured to accept a protection request from one of the end nodes and determine whether a local resource for a protection path is available for the protection request. If the local resource is available, the intermediate node forwards the protection request along the protection path, but, if the local resource is unavailable, the intermediate node notifies the end node from which the protection request originated that the protection path is unavailable.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
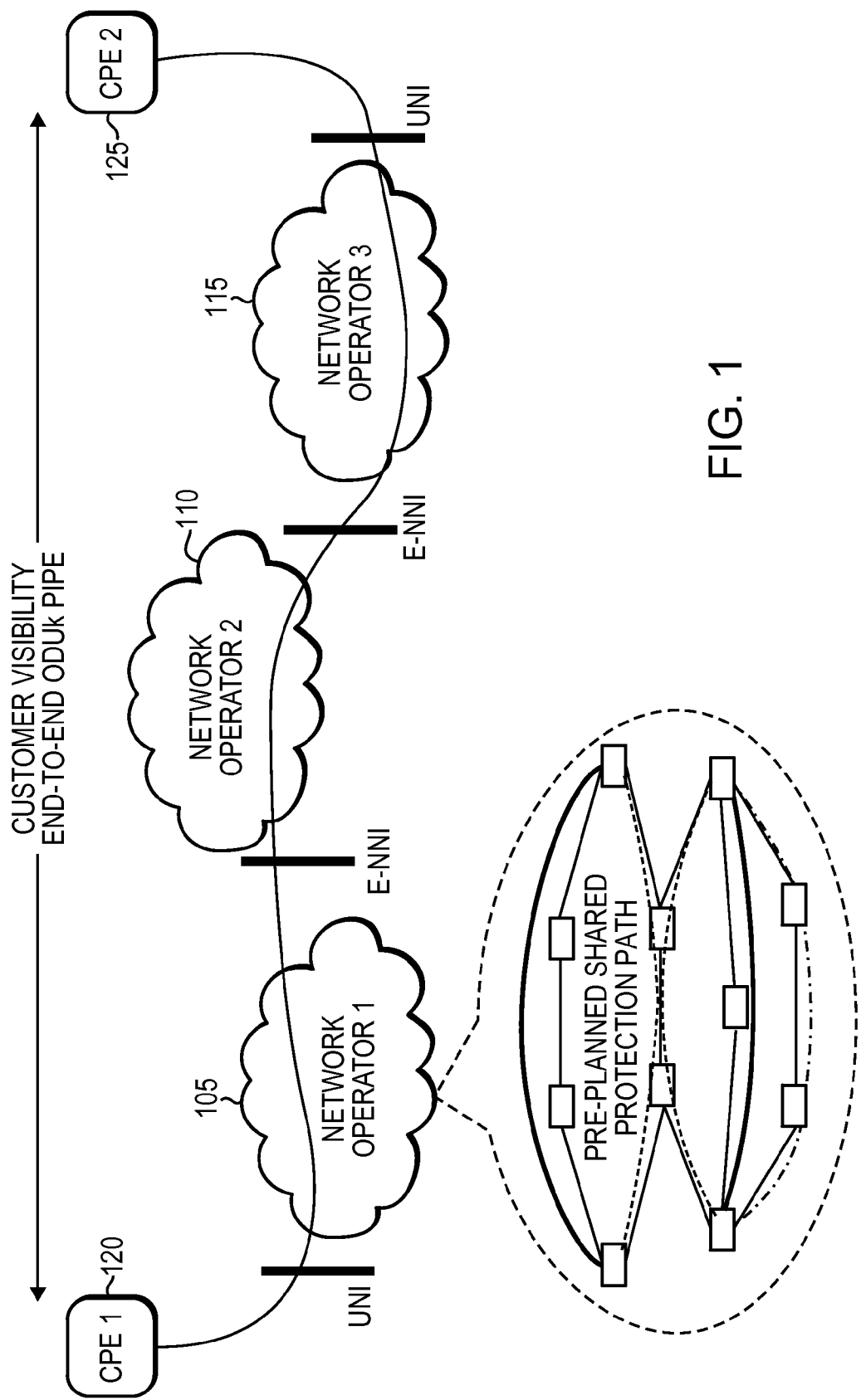
FIG. 1 is a schematic diagram of an overall network including multiple subnetworks, where at least one of the subnetworks includes a preplanned shared protection path through the subnetwork.

A description of example embodiments of the invention follows.

There are a number of standardized approaches to increasing service availability that optimize either switching time or flexibility, but not both. Linear protection, for example, includes 1+1 and M:N (where M is typically 1) protection. 1+1 protection operates very quickly but requires 100% overbuild for each working path through a network (that is, each path consumes twice the network resources needed to support the service). M:N protection offers some improvement in terms of resource requirements (M sets of protecting resources for N sets of service resources) and offers similar performance to 1+1 protection; however, all linear protection approaches require that the services sharing the protection resources have the same endpoints in the network, making them not generally applicable for a mesh network. A shared protection ring provides 1:N protection in a network that has a ring topology, but shared ring protection is applicable only in networks that have a ring topology. Control-plane-based restoration uses dynamic signaling to request that a failed service be restored using network resources that are available at the time the failure is detected. As such, it can operate in a network having an arbitrary topology; however, control plane approaches activate protection paths via packet based signaling messages, which are subject to congestion and message loss, and which impacts the speed to activate protection.

The embodiments disclosed herein provide a mechanism for sharing protection resources in an arbitrary network topology (i.e., the mechanism has the flexibility of a control-plane-based solution), but involves pre-computing the protection resources so that data-plane-based protection can be used to activate the protection resources upon detection of a failure, thus, providing faster switching times. This is accomplished by configuring a mesh network to include, for a working path in the network, one or more protection paths with the same end nodes as the working path, where each protection path includes at least one intermediate node that is not part of the working path. The intermediate node is configured to accept a protection request from one of the end nodes and to determine whether a local resource for a protection path is available for the protection request. If the local resource is available, the intermediate node forwards the protection request along the protection path, but, if the local resource is unavailable, the intermediate node notifies the end node from which the protection request originated that the protection path is unavailable. The end nodes may activate the protection path upon receipt along the protection path of the protection request sent by the other end node of the working path. As know in the art, a working path uses bandwidth and resources, and a protection path has reserved bandwidth or resources, but does not use the resources/bandwidth until it is activated so that it can be shared by multiple working paths with different end points.

In some embodiments, the intermediate node may include a record (e.g., table) with a status of each protection path associated with the intermediate node, where the intermediate node determines whether a local resource for a protection path is available based on the record. In other embodiments, the network may include multiple nested protection domains, where the intermediate node determines that a local resource for a protection path is available for the protection request if the protection path is at the same or higher level protection domain. In such embodiments, an end node may initiate a protection request for a higher level protection path if all lower level protection paths associated with the end node are unavailable. In some embodiments, the intermediate node may include fewer local resources than protection paths associated with the intermediate node or may monitor availability of local resources at the intermediate node and send updates to the end nodes regarding the availability. Further, the protection request may include an indication of priority, and the intermediate node may determine whether to preempt an already-activated protection path in favor of the protection request based on the indication of priority.

FIG. 1 is a schematic diagram of an overall network including multiple subnetworks 105, 110, 115, where at least one of the subnetworks 105 includes a preplanned shared protection path through the subnetwork 105. The overall network includes two customer-premise equipment (CPE) 120, 125 connected using, for example, an Optical Channel Data Unit-k (ODUk) pipe though the three subnetworks 105, 110, 115. Between the CPEs 120, 125 and subnetworks 105, 115 are User-to-Network Interfaces (UNIs), and between the subnetworks 105, 110, 115 are External Network-to-Network Interfaces (E-NNIs). As shown, subnetwork 105 may be protected using the embodiments disclosed herein.

Figure 2:
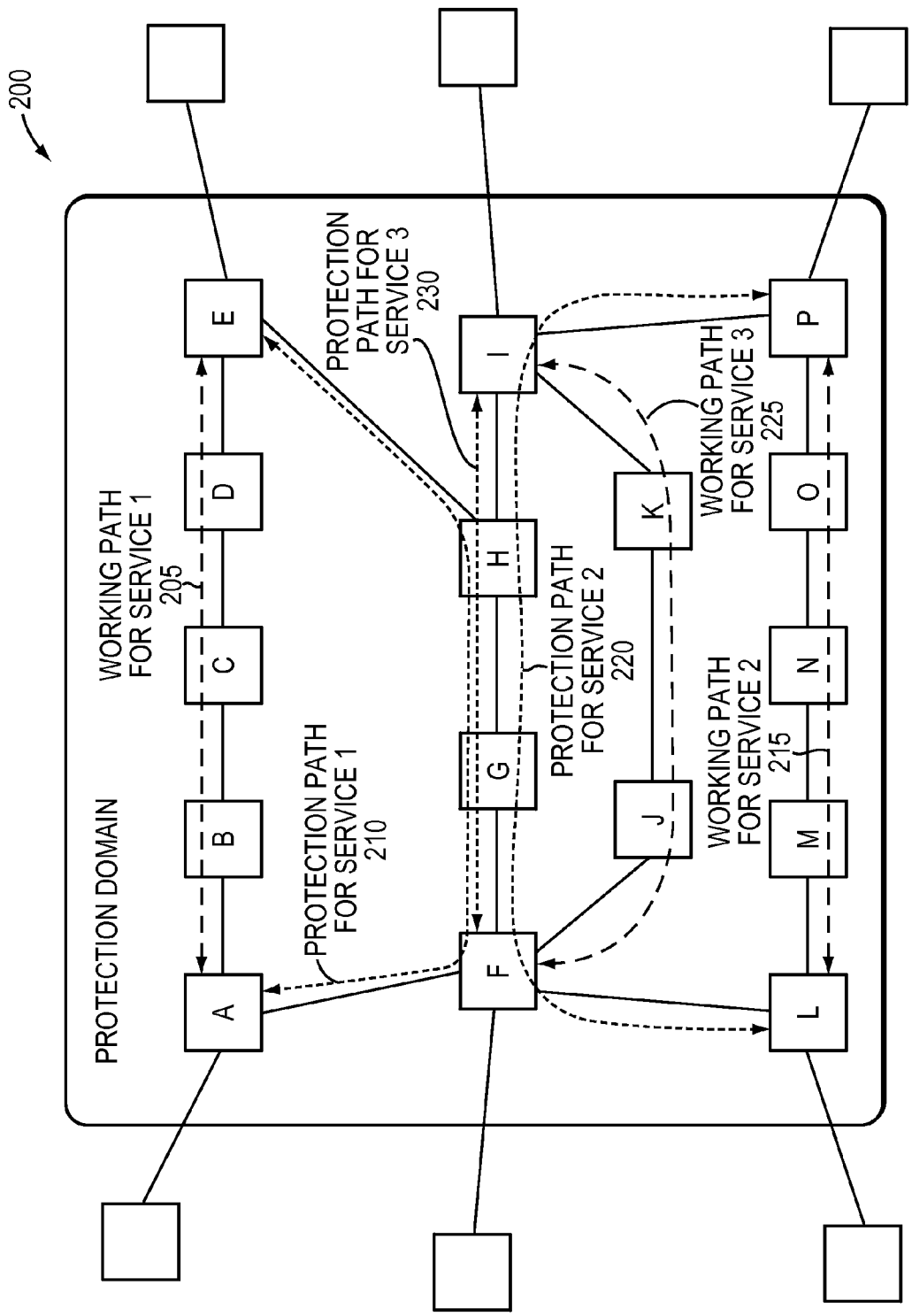
FIG. 2 is a block diagram illustrating a mesh network for a subnetwork of FIG. 1 with working and protection paths for a number of services, according to an example embodiment of the present invention.

FIG. 2 is a block diagram illustrating a mesh network 200 with working and protection paths 205, 210, 215, 220, 225, 230 for a number of services, according to an example embodiment of the present invention. As shown, the network includes M network resources shared by N services for protection (M:N). Service 1 includes nodes A, B, C, D, and E and is protected by intermediate nodes F, G, and H. Service 2 includes nodes L, M, N, O, and P and is protected by intermediate nodes F, G, H, and I. Service 3 includes node F, G, H, and I and is protected by intermediate nodes J and K. According to the example embodiment, the protection functions for the N working paths, which share some of the same M resources, do not necessarily share the same end nodes. A given node in the network can be an intermediate node of a protection path for one service, and may be an end node of a protection path for another service. For example, node F is a protection end node for Service 3 and a protection intermediate node for Service 2.

For a complex mesh network, it is useful to decompose the M:N protection problem into more manageable M:1 sub-problems. As such, an M:N shared mesh protection (SMP) domain may be discomposed into N M:1 shared mesh protection components. Each of the SMP components may include a working path with two end nodes and monitoring entities, and a pool of M monitored protection resources shared with other SMP components. The protection resources should have two protection end nodes that are co-located with the working path, and should include at least one intermediate node that is not part of the working path. A resource allocation protocol can be used to monitor resource availability, grant resource to an activation request based on a switch request priority or resource priority, and send notification to end nodes indicating the resource availability. To indicate priority for a switch request, a service identifier and priority may be encoded with the switch request in a data overhead for activating a protection path for the service.

An example of protection path activation and deactivation is as follows. A working path can include two end nodes that also act as protection end nodes (PENs). The working path may be a bidirectional working path and may have monitor entities provisioned. Protecting the working path is one or more Virtual Protection Paths (VPPs) with at least one Protection Intermediate Node (PIN) and sharing a pool of K resources with other M:1 protection components. Because the VPPs share resources with other M:1 protection components, a given VPP is not activated until resources are assigned to it. The PINs can also have monitor entities provisioned.

The PENs may run a M:1 linear protection protocol to make decisions regarding switching traffic between the working path and a protection path. The PINs can run the protocol to check the resource pool to decide which VPPs have resources available, select one of the VPPs that has resources available, and assign the resources to the protection component that requires activating its VPP for protection. The PINs also activate the VPP assigned to the protection component that obtains the grant for the resources. To accomplish this, Automatic Protection Switching (APS) messages may be exchanged between the PENs along the working path, and an APS message can be used to activate a VPP at a PIN. If priority is to be taken into consideration, the APS message may include in the switch request a VPP identifier and a service priority.

The monitor entities of the working path monitor for signal failure (SF) and signal degradation (SD). If SF or SD is detected, a protocol state machine can be used to make a switching decision based on the protocol. If a decision is made to switch to a protection path, an end node can send an APS with a VPP identifier to activate the VPP. A PIN along the protection path may then determine if the activation request should be granted based on the priority of the switch request and priority of the service encoded in the received APS on the available VPPs. If the request is to be granted the PIN may activate a connection, and if no more resources for the VPP remain available after the activation, the PIN may also send a Resource Usage Notification (RUN) message indicating that the Resource is Not Available (RNA) to a management plan or control plane. A RUN message with RNA may also be sent if the monitor entity on the VPPs detects a failure.

When the failure on working path is cleared, or a switch request to switch traffic away from the VPPs is received, an APS with a VPP identifier of "0" or null may be sent to de-activate the VPPs. The PIN may wait for a certain period of time before de-activating a connection after receiving an APS message with a VPP identifier of "0" or null. If the connection for the VPP is de-activated so that the resource is free, the PIN may send a RUN message indicating Resource Available (RA) to the management plan or control plane. A RUN message can also be sent to PENs for those M:1 protection components that share the resources. RUN messages can also be sent between PENs of the M:1 protection components of any nested protection domains to coordinate protection groups at different level protection domains for the same service.

Overall, the Virtual Protection Paths (VPPs) are preplanned restoration paths, each associated with two Protection End Nodes (PENs), that include at least one Protection Intermediate Node (PIN), may have their availability monitored and reported using Resource Usage Notification (RUN) messages, and may be activated by one of the PENs via a switching request encoded in an APS message. Depending on the particular data plane protocol used (e.g., SONET/SDH, OTN, Ethernet), 3 bits (0-7) may be used to indicate VPP priority, where a higher priority preempts lower priority, regardless of switch priority. Within the same VPP priority, a higher switch priority may preempt a lower priority. One bit may be used for the switch priority. Further, VPP identifiers (IDs) may be managed by the management plan or control plane. A VPP ID of 0x000000 may be null, and 0x000001-0x00FFFF can be used for $2^{16}$=65,535 VPPs.

Figure 3:
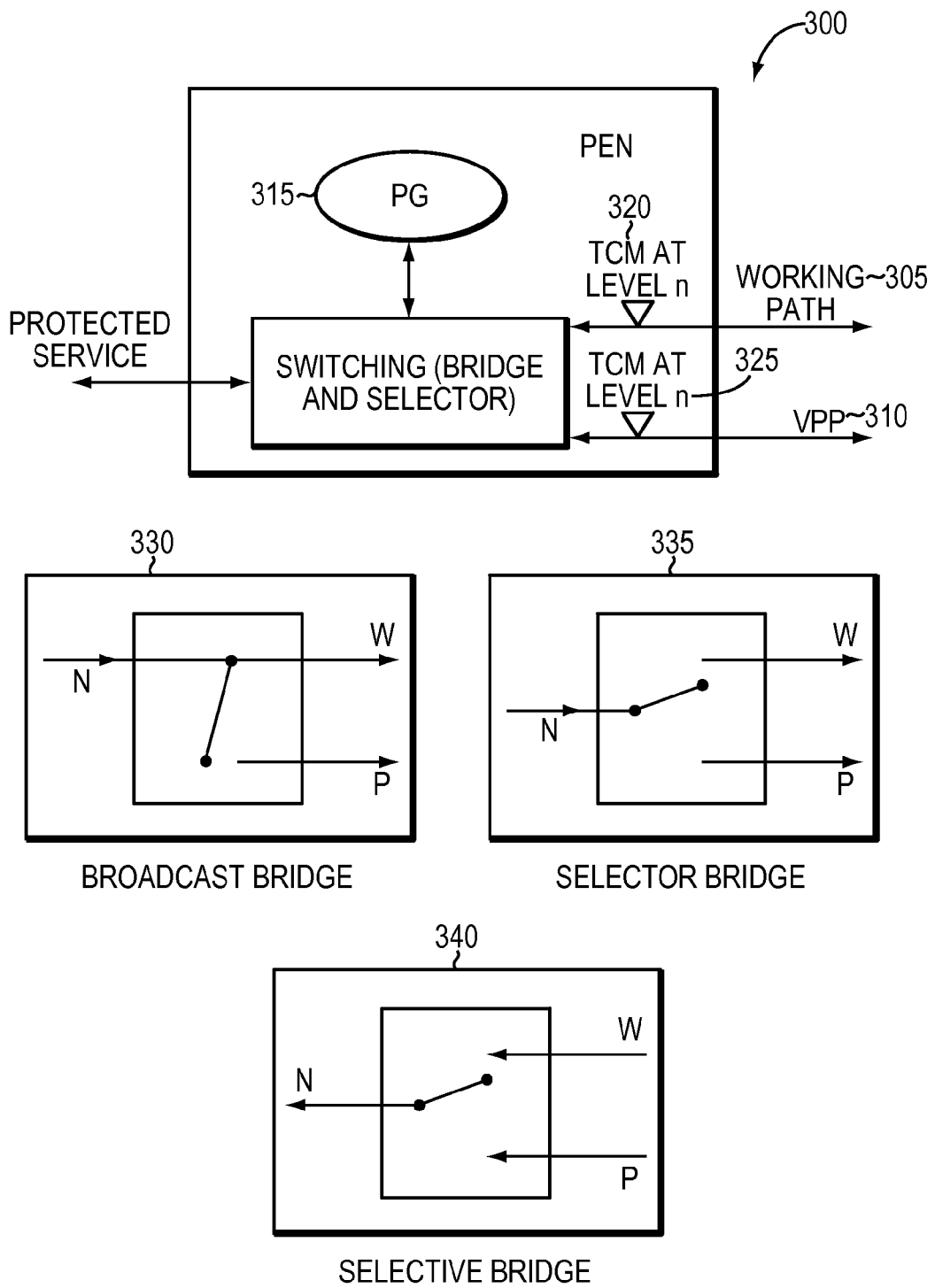
FIG. 3 is a block diagram illustrating an end node of working and protection paths through a mesh network, according to an example embodiment of the present invention.

FIG. 3 is a block diagram illustrating an end node 300 of working and protection paths 305, 310 through a mesh network, according to an example embodiment of the present invention. The illustrated Protection End Node (PEN) 300 is associated with both a working path 305 and a VPP 310, and supports a Protection Group (PG) 315, which are the entities associated with the working and protection paths 305, 310. The PEN 300 can include Tandem Connection Monitoring (TCM) entities 320, 325 for monitoring the working path 305 and VPP 310. To support a protection switching function, the PEN 300 may include, for example, a broadcast bridge 330 or selector bridge 335 for transmitting, and a selective bridge 340 for receiving.

Figure 4A:
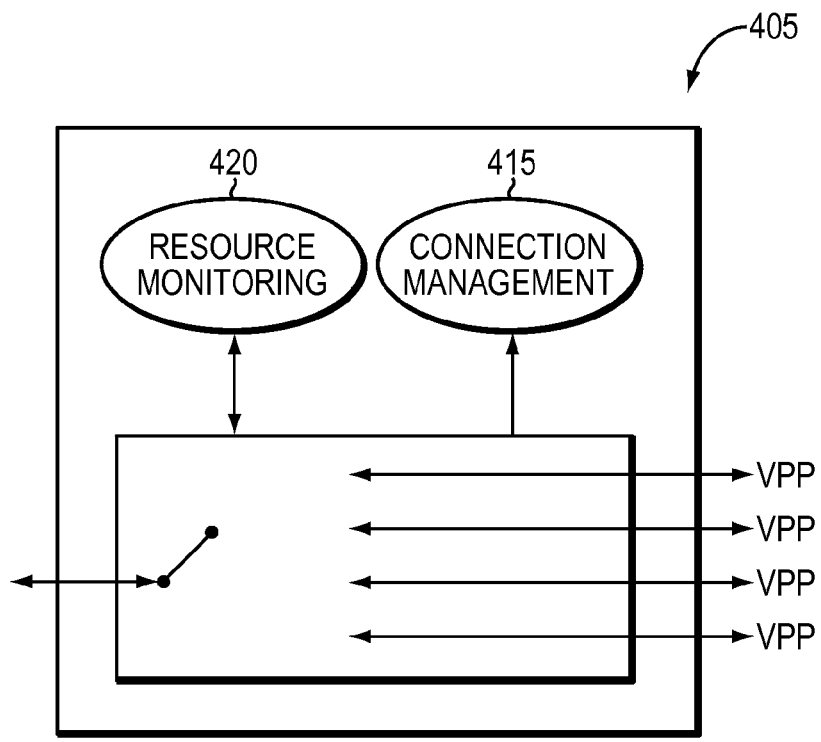
FIGS. 4A and 4B are block diagrams illustrating intermediate nodes along a protection path through a mesh network, according to an example embodiment of the present invention.
Figure 4B:
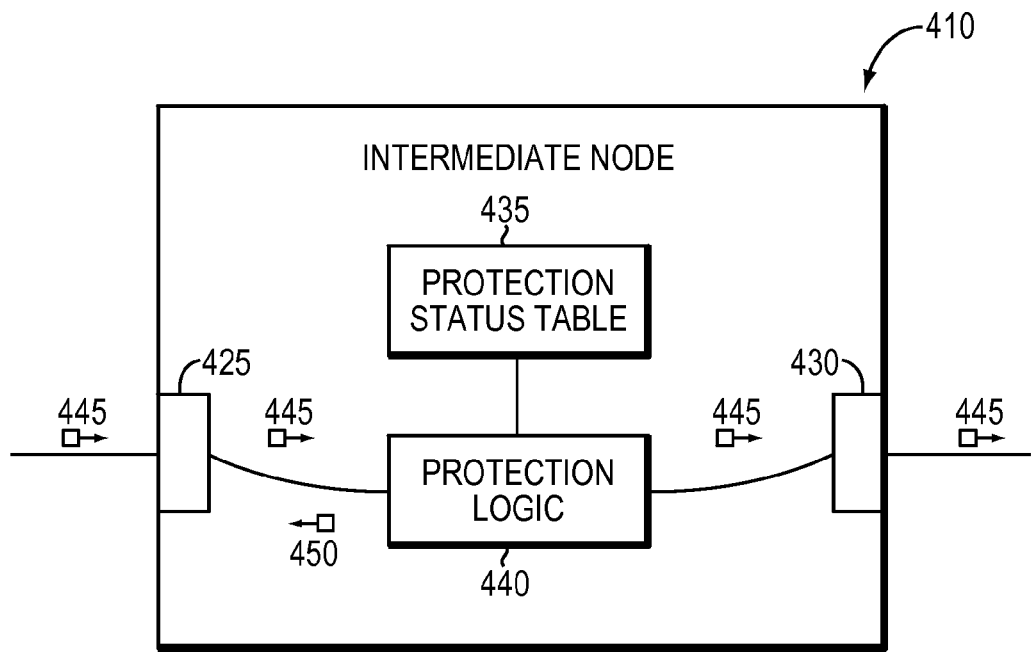

FIGS. 4A and 4B are block diagrams illustrating various aspects of an intermediate node along a protection path through a mesh network, according to an example embodiment of the present invention. FIG. 4A shows a Protection Intermediate Node (PIN) 405 supporting both connection functions 415, such as tracking whether a VPP is available, and resource monitoring and reporting functions 420, such as sending RUN messages. FIG. 4B shows example physical components of a PIN 410, including a first interface 425 to a first portion of a protection path, a second interface 430 to a second portion of the protection path, and a table 435 including a status of the protection path. FIG. 4B further illustrates that protection logic 440 is used to determine, upon receipt of a protection request 445 over the first interface 425, whether the protection path is available based on the status. The protection logic further causes the protection request 445 to be forwarded over the second interface 430 if the protection path is available. The logic may, alternatively, cause a notification 450 that the protection path is unavailable to be sent along the first interface 425 if the protection path is unavailable. It should be noted that the PIN may include a plurality of additional interfaces associated with a plurality of additional protection paths, each having a status in the table.

Figure 5:
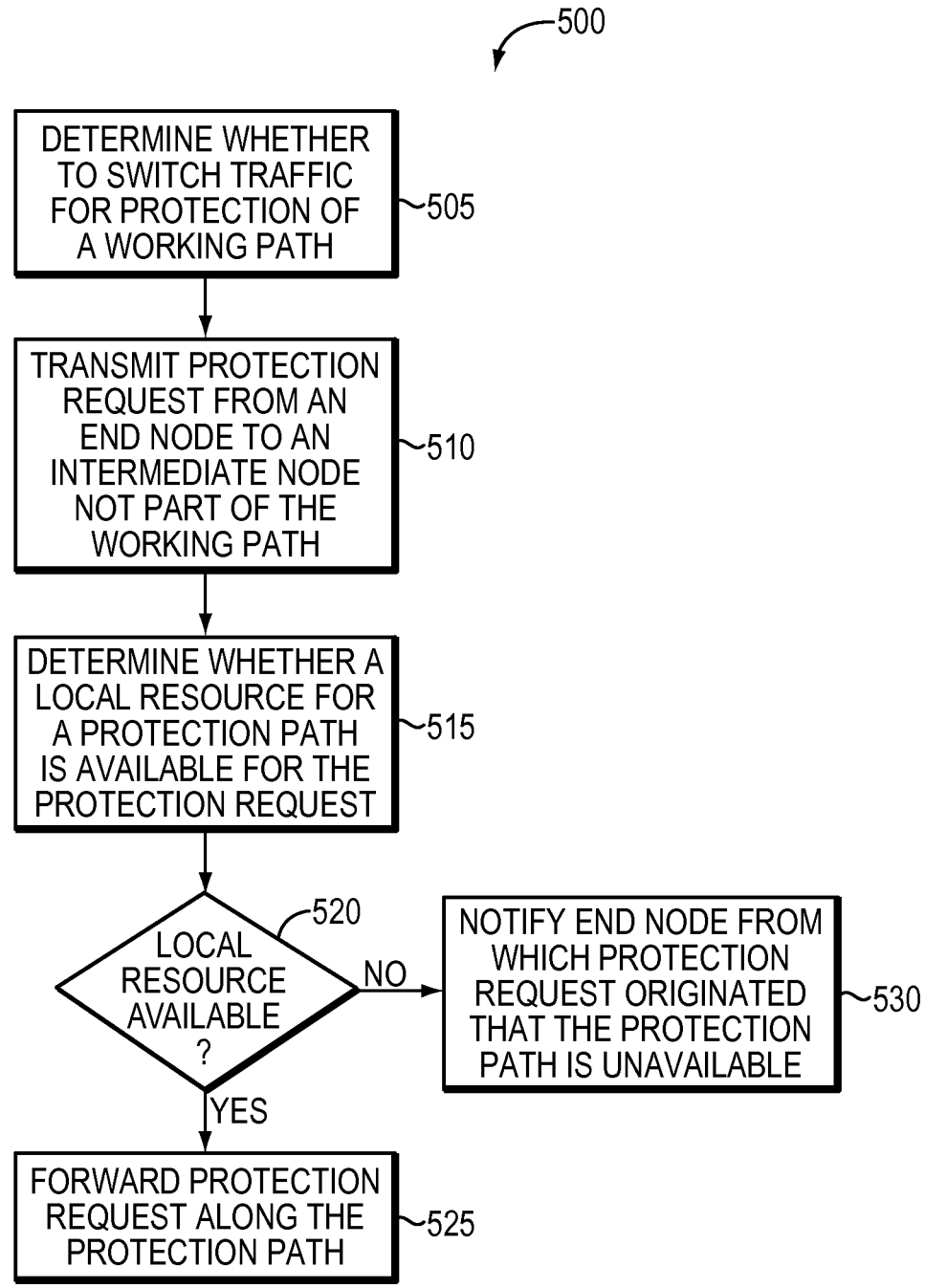
FIG. 5 is a flow diagram illustrating implementation of a protection path through a mesh network, according to an example embodiment of the present invention.

FIG. 5 is a flow diagram 500 illustrating implementation of a protection path through a mesh network, according to an example embodiment of the present invention. According to the example method, following detection by an end node of a fault along a working path between two end nodes, the same end node determines (505) a protection path to activate based on protection protocol and transmits (510) a protection activation request to the next node on the determined protection path. At the intermediate node, if it is the next node, it is determined (515) whether a local resource for the protection path is available (520) for the protection request. If the local resource is available, the intermediate node activates the connection and forwards (525) the protection request along the protection path. Alternatively, the intermediate node notifies (530) the end node from which the protection request originated that the protection path is unavailable if the local resource is unavailable. After forwarding the protection request, the protection path may be activated upon receipt of the protection request at the other end node along the protection path.

In embodiments that take priority into consideration, transmitting the protection request from the end node may include providing an indication of priority of the traffic in the protection request. In such embodiments, determining whether a local resource for a protection path is available may include determining whether to preempt an already-activated protection path in favor of the protection request based on the indication of priority. According to further embodiments, determining whether to preempt an already-activated protection path may include deactivating an already-activated protection path with a lower priority indication, transmitting an unavailability message to an end node associated with the already-activated protection path, and determining that a local resource for the requested protection path is then available.

The protection path may be deactivated upon receipt of a null protection request by each of the intermediate nodes along the protection path. For example, an end node may transmit such a deactivation request to the next node on the protection path. At the next node, the connection is deactivated and the deactivation request is forwarded along the protection path. The protection path may be deactivated upon receipt of the deactivation request at the other end node along the protection path.

Figure 6:
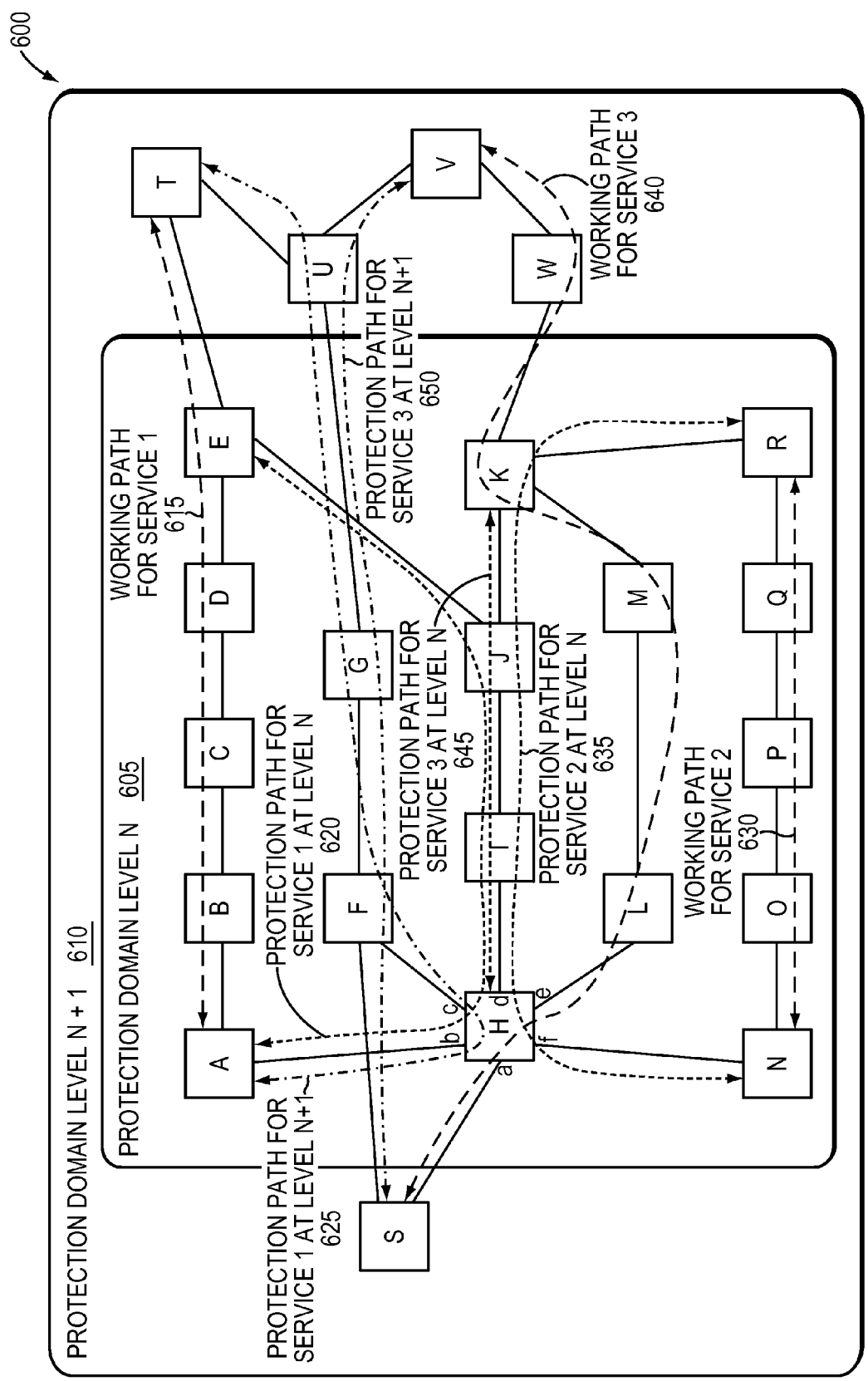
FIG. 6 is a block diagram illustrating a mesh network with working and protection paths for a number of services over multiple protection domains, according to an example embodiment of the present invention.

FIG. 6 is a block diagram illustrating a mesh network 600 with working and protection paths 615, 620, 625, 630, 635, 640, 645, 650 for a number of services over multiple protection domains 605, 610, according to an example embodiment of the present invention. FIG. 6 shows two nested protection domains, Protection Domain Level N 605 and Protection Domain Level N+1 610. Level N 605 protects failures within boundary of Level N 605. Level N+1 610 protects failures within the boundary of Level N+1 610, but not within the boundary of Level N 605. Level N+1 610 can also protect failures within the boundary of Level N 605 when those failures are not able to be protected by Level N 605 due to resources being unavailable, for example. In the example network 600, Service 1 includes nodes A, B, C, D, E, and F, protected by both Level N 605 and Level N+1 610. Service 2 includes nodes N, O, P, Q, and R, protected by Level N 605 only. Service 3 includes nodes S, H, L, M, K, W, and V, protected by both Level N 605 and Level N+1 610.

The following is an example of a failure within Level N+1 610, but not within Level N 605. A failure between nodes E and T may be detected by nodes A and T at Level N+1 610. Node A, for example, may activate a VPP along nodes H, F, G, and U. The following table shows an example of a VPP table for node H after the protection switch.

| VPPID | Level | Source Port ID | Destination Port ID | Status |
|---|---|---|---|---|
| 1 | N | b | d | Not Active |
| 2 | N | f | d | Not Active |
| 3 | N | a | d | Not Active |
| 4 | N + 1 | b | c | Active |

The following is an example of a dual failure within Level N 605. A failure between nodes O and P may be detected by nodes N and R at Level N 605. Node N, for example, may activate a VPP along nodes H, I, J, and K. Node H may send a RUN message to nodes A and S indicating that resource "port d" is not available. A second failure occurring between nodes B and C may then be detected at Level N 605 by nodes A and E, but it will not activate a VPP because resource "port d" is unavailable. Nodes A and S at Level N+1 610 also detect the failure, and node A may activate a VPP along nodes H, F, G, and U. The following table shows an example of a VPP table for node H after the protection switch.

| VPPID | Level | src-ID | dest-ID | Status |
|---|---|---|---|---|
| 1 | N | b | d | Not Active |
| 2 | N | f | d | Active |
| 3 | N | a | d | Not Active |
| 4 | N + 1 | b | c | Active |

While this invention has been particularly shown and described with references to example embodiments thereof, it will be understood by those skilled in the art that various changes in form and details may be made therein without departing from the scope of the invention encompassed by the appended claims. Various embodiments of the invention have been described with specific configurations for ease of description. However, the invention need not be limited to the embodiments described and shown in the figures. For example, while the examples show two protection domains, there may be any number of protection domains. Similarly there may be any number of nodes in each protection domain.

Further, it should be understood that the flow diagram of FIG. 5 is an example that can include more or fewer components, can be partitioned into subunits, and can be implemented in different combinations. Moreover, the flow diagram may be implemented in hardware, firmware, or software. If implemented in software, the software may be written in any software language suitable for use in networks and nodes as illustrated in FIGS. 1-4B and 6. The software may be embodied on any form of computer readable medium, such as RAM, ROM, or magnetic or optical disk, and loaded and executed by generic or custom processor(s).

What is claimed is:

1. A mesh network comprising:
a working data path including end nodes;
a protection data path including the end nodes and an intermediate node not part of the working data path, the intermediate node configured to (i) accept a protection request along a data path from an end node, (ii) determine whether a local resource for a protection data path is available for the protection request, (iii) (a) activate a connection of the protection data path if the local resource is available and (b) forward the protection request along the protection data path to use to activate a next connection of the protection data path if the local resource is available, and (iv) notify, along the data path, the end node from which the protection request originated that the protection data path is unavailable if the local resource is unavailable for enabling a connection of the protection data path to be activated; and
multiple nested protection domains, wherein the intermediate node is further configured to determine that the local resource for the protection data path is available for the protection request if the protection data path is at the same or higher level protection domain compared with protection domains of other available protection data paths that are available for the protection request.

2. A mesh network as in claim 1 wherein the intermediate node includes a record of a status of each protection data path associated with the intermediate node, and wherein the intermediate node is further configured to determine whether the local resource for the protection data path is available based on the record.

3. A mesh network as in claim 1 wherein an end node initiates the protection request for a higher level protection data path if all lower level protection data paths associated with the end node are unavailable.

4. A mesh network as in claim 1 wherein the intermediate node includes fewer local resources than protection data paths associated with the intermediate node.

5. A mesh network as in claim 1 wherein the intermediate node is further configured to monitor availability of local resources at the intermediate node and to send updates to the end nodes regarding the availability.

6. A mesh network as in claim 1 wherein the end nodes are configured to activate the protection data path upon receipt along the protection data path of the protection request sent by an other end node of the working data path.

7. A mesh network as in claim 1 wherein the protection request includes an indication of priority of the working data path, and wherein the intermediate node is further configured to determine whether to preempt an already-activated protection data path in favor of the protection request based on the indication of priority.

8. A node in a mesh network comprising:
a first interface to a first portion of a protection data path;
a second interface to a second portion of the protection data path;
a record including a status of the protection data path; and
logic to determine upon receipt of a protection request along a data path over the first interface whether the protection data path is available based on the status, to activate a connection of the protection data path, and to cause the protection request to be forwarded over the second interface if the protection data path is available,
the logic being associated with multiple nested protection domains and the logic determining that a local resource for the protection data path is available for the protection request if the protection data path is at the same or higher level protection domain compared with protection domains of other available protection data paths that are available for the protection request.

9. A node as in claim 8 wherein the logic causes a notification that the protection data path is unavailable to be sent along the first interface if the protection data path is unavailable.

10. A node as in claim 8 further comprising a plurality of additional interfaces associated with a plurality of additional protection data paths.

11. A node as in claim 10 wherein the record includes a status for each protection data path associated with the plurality of interfaces.

12. A node as in claim 8 wherein the protection request includes an indication of priority, and wherein the logic determines whether to preempt an already-activated protection data path in favor of the protection request based on the indication of priority.

13. A method for sharing protection resources in a mesh network, the method comprising:
following detection of a fault along a working data path between end nodes, determining at one of the end nodes to switch traffic for protection;
transmitting a protection request along a data path from the end node to an intermediate node not part of the working data path;
determining at the intermediate node whether a local resource for a protection data path is available for the protection request;
activating a connection of the protection data path if the local resource is available and forwarding the protection request along the protection data path to use to activate a next connection of the protection data path if the local resource is available;
notifying, along the data path, the end node from which the protection request originated that the protection data path is unavailable if the local resource is unavailable for enabling a connection of the protection data path to be activated,
associating the local resource with multiple nested protection domains; and
determining whether the local resource for the protection data path is available including determining that the local resource for the protection data path is available for the protection request if the protection data path is at the same or higher level protection domain compared with protection domains of other available protection data paths that are available for the protection request.

14. A method as in claim 13 further comprising:
activating the protection data path upon receipt of the protection request at the other node along the protection data path.

15. A method as in claim 13 further comprising:
deactivating the protection data path upon receipt of a null protection request by each intermediate node along the protection data path.

16. A method as in claim 13 wherein transmitting a protection request from the end node includes providing an indication of priority of the traffic in the protection request, and wherein determining whether the local resource for a protection data path is available includes determining whether to preempt an already-activated protection data path in favor of the protection request based on the indication of priority.

17. A method as in claim 16 wherein determining whether to preempt an already-activated protection data path includes deactivating an already-activated protection data path with a lower priority indication, transmitting an unavailability message to an end node associated with the already-activated protection data path, and determining that the local resource for the requested protection data path is available.

18. A method as in claim 13 further comprising initiating a protection request from an end node for a higher level protection data path if all lower level protection data paths associated with the end node are unavailable.

19. A mesh network comprising:
a plurality of working data paths each including end nodes;
a plurality of protection data paths shared among at least some of the working data paths for protection, each protection data path including the end nodes of at least one of the working data paths and an intermediate node not part of that working data path, the intermediate node configured to (i) accept a protection request along a data path from an end node, (ii) determine whether a local resource for a protection data path is available for the protection request, (iii) (a) activate a connection of the protection data path if the local resource is available and (b) forward the protection request along the protection data path to use to activate a next connection of the protection data path if the local resource is available, and (iv) notify, along the data path, the end node from which the protection request originated that the protection data path is unavailable if the local resource is unavailable for enabling a connection of the protection data path to be activated; and
multiple nested protection domains, wherein the intermediate node is further configured to determine that the local resource for the protection data path is available for the protection request if the protection data path is at the same or higher level protection domain compared with protection domains of other available protection data paths that are available for the protection request.

20. The mesh network as in claim 1 wherein data-plane-based protection activates the local resource for the protection data path upon detection of a failure.

21. The mesh network as in claim 20 wherein the data-plane-based protection employs a data plane protocol.

22. The mesh network as in claim 21 wherein the data plane protocol utilizes a SONET, SDH, SONET/SDH, OTN, Ethernet, or APS message.

23. The mesh network as in claim 1 wherein the end nodes have a corresponding plurality of failed working data paths and a single protection data path that functions as a backup path simultaneously for each working data path of the plurality of failed working data paths.

24. The mesh network as in claim 1 wherein the intermediate node is further configured to deactivate at least one existing connection along the data path.

25. The method as in claim 13, further comprising deactivating at least one existing connection along the data path.

26. The mesh network as in claim 19 wherein the intermediate node is further configured to deactivate at least one existing connection along the data path.

* * * * *